United States Patent
Saame et al.

(10) Patent No.: US 9,394,956 B2
(45) Date of Patent: Jul. 19, 2016

(54) BRAKE DISC FOR A DISC BRAKE OF A MOTOR VEHICLE

(71) Applicants: Audi AG, Ingolstadt (DE); Fritz Winter Eisengiesserei GmbH & Co. KG, Stadtallendorf (DE)

(72) Inventors: Christoph Saame, Gaimersheim (DE); Reiner Becker, Rabenau (DE); Volker Posch, Kirchhain (DE)

(73) Assignees: AUDI AG, Ingolstadt (DE); FRITZ WINTER EISENGIESSEREI GMBH & CO. KG, Stadtallendorf (DE)

( * ) Notice: Subject to any disclaimer, the term of this patent is extended or adjusted under 35 U.S.C. 154(b) by 14 days.

(21) Appl. No.: 14/175,343

(22) Filed: Feb. 7, 2014

(65) Prior Publication Data

US 2014/0224602 A1 Aug. 14, 2014

(30) Foreign Application Priority Data

Feb. 8, 2013 (DE) .......................... 10 2013 002 300

(51) Int. Cl.
*F16D 65/12* (2006.01)
*F16D 65/02* (2006.01)

(52) U.S. Cl.
CPC .............. *F16D 65/128* (2013.01); *F16D 65/12* (2013.01); *F16D 65/123* (2013.01); *F16D 2065/1316* (2013.01); *F16D 2065/1328* (2013.01); *F16D 2065/1344* (2013.01); *F16D 2065/1356* (2013.01); *F16D 2065/1392* (2013.01); *F16D 2200/0013* (2013.01); *F16D 2250/0015* (2013.01)

(58) Field of Classification Search
CPC ... F16D 65/123; F16D 65/125; F16D 65/128; F16D 2065/1344; F16D 2065/1392; F16D 2065/1356
USPC ..................................... 188/218 XL
See application file for complete search history.

(56) References Cited

U.S. PATENT DOCUMENTS

| | | | | |
|---|---|---|---|---|
| 3,926,285 | A * | 12/1975 | Preller et al. | 188/218 XL |
| 4,042,071 | A * | 8/1977 | Pollinger | 188/18 A |
| 5,358,080 | A | 10/1994 | Donabedian | |
| 5,823,303 | A * | 10/1998 | Schwarz et al. | 188/218 XL |
| 7,467,694 | B2 * | 12/2008 | Botsch | 188/218 XL |
| 7,600,614 | B2 * | 10/2009 | Doppling et al. | 188/218 XL |
| 2003/0159893 | A1 * | 8/2003 | Tironi | 188/71.1 |

(Continued)

FOREIGN PATENT DOCUMENTS

| DE | 1164761 B | * 3/1964 |
|---|---|---|
| DE | 1 922 803 | 9/1965 |

(Continued)

OTHER PUBLICATIONS

EPO translation, DE 43 36 617 C1, Luger, Mar. 1995.*

*Primary Examiner* — Thomas J Williams
(74) *Attorney, Agent, or Firm* — Henry M. Feiereisen LLC

(57) ABSTRACT

A brake disc for a disc brake of a motor vehicle includes a pot-shaped carrier part; a friction ring, and multiple connecting elements distributed in circumferential direction of the disc brake extending in radial direction, and configured as separate components, wherein the carrier part and the friction ring are fixedly interconnected in radial direction via the multiple connecting elements, wherein the connecting elements are form fittingly connected with the carrier part and with the friction ring.

6 Claims, 1 Drawing Sheet

(56) References Cited

U.S. PATENT DOCUMENTS

| | | | |
|---|---|---|---|
| 2004/0173418 A1* | 9/2004 | Saame et al. | 188/17 |
| 2010/0089710 A1* | 4/2010 | Franke | 188/218 XL |
| 2010/0258394 A1* | 10/2010 | Hanna et al. | 188/264 A |
| 2011/0162926 A1 | 7/2011 | Botsch | |
| 2011/0259682 A1* | 10/2011 | Mueller | 188/218 XL |
| 2011/0278115 A1 | 11/2011 | Drewes | |
| 2012/0090929 A1* | 4/2012 | Lathwesen | 188/218 XL |

FOREIGN PATENT DOCUMENTS

| | | | |
|---|---|---|---|
| DE | 4336617 C1 * | | 3/1995 |
| DE | 693 05 145 | | 4/1997 |
| DE | 600 00 008 | | 3/2002 |
| DE | 101 03 639 | | 8/2002 |
| DE | 10217616 A1 * | | 11/2003 |
| DE | 103 22 454 | | 2/2004 |
| DE | 102006043945 | | 3/2008 |
| DE | 102007001211 | | 7/2008 |
| DE | 102008021625 | | 11/2008 |
| DE | 102008046546 | | 3/2010 |
| DE | 102008044339 | | 6/2010 |
| DE | 102008061915 | | 6/2010 |
| DE | 102009027116 | | 12/2010 |
| DE | 102011053253 A1 * | | 3/2013 |
| EP | 933551 A1 * | | 8/1999 |
| EP | 1122456 | | 8/2001 |
| EP | 2 275 702 | | 1/2011 |
| EP | 2716930 A1 * | | 4/2014 |
| EP | 2716931 A1 * | | 4/2014 |
| GB | 1149126 A * | | 4/1969 |
| JP | 2006-37993 | | 2/2006 |
| WO | WO 2010063831 A1 * | | 6/2010 |

* cited by examiner

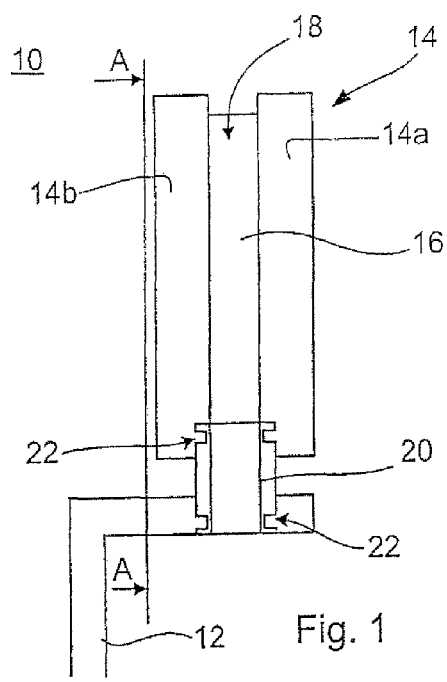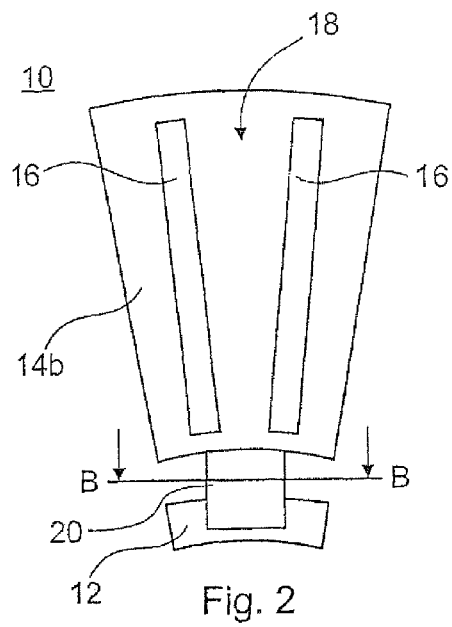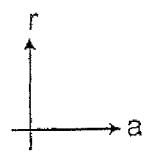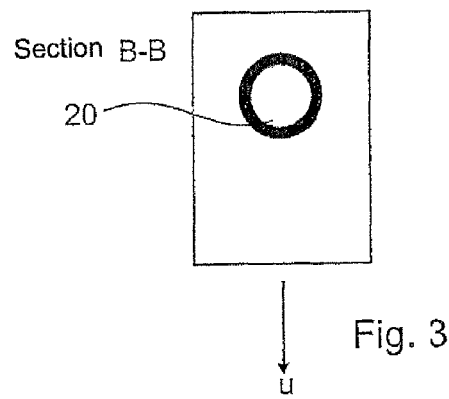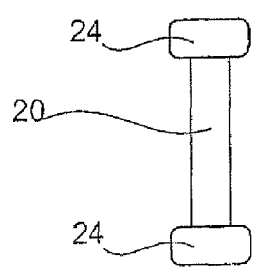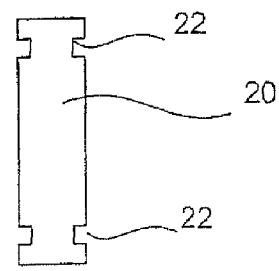

BRAKE DISC FOR A DISC BRAKE OF A MOTOR VEHICLE

CROSS-REFERENCES TO RELATED APPLICATIONS

This application claims the priority of German Patent Application, Serial No. 10 2013 002 300.9, filed Feb. 8, 2013, pursuant to 35 U.S.C. 119(a)-(d), the disclosure of which is incorporated herein by reference.

BACKGROUND OF THE INVENTION

The present invention relates to a brake disc for a disc brake of a motor vehicle.

The following discussion of related art is provided to assist the reader in understanding the advantages of the invention, and is not to be construed as an admission that this related art is prior art to this invention.

Conventionally a brake-disc friction ring is produced in the casting process—usually sand casting—from high carbon grey cast iron. For various reasons grey cast iron is an optimal material for friction bodies. In multiple applications the carrier part of the brake disc has long been produced from aluminum or aluminum alloys in order to save weight. In these constructions it is considered important that the friction ring and the brake-disc chamber are radially movable relative to each other in order to minimize thermal tensions, which occur in the friction ring during each braking procedure. The radial degree of freedom is generated via a fit clearance, which is generated by mechanical processing and an inserted connecting element. For conceptual reasons the complex mechanical processing between the casting processes and the required fit tolerances causes high manufacturing costs. Such a brake disc is for example disclosed in EP 2 275 702 B1. A generic brake disc, which has internal ventilation and includes a pot-shaped carrier part, a friction ring, and multiple connecting elements distributed in circumferential direction of the disc brake and extending in radial direction, and configured as separate components, wherein the carrier part and the friction ring are fixedly interconnected in radial direction via the multiple connecting elements, wherein the connecting elements are form fittingly connected with the carrier part is known from DE 101 03 639 A1.

According to the teaching of DE 101 0-3 639 A1 the connection between the carrier part and the connecting elements is configured as form fitting connection, while the fastening between the friction ring and connecting elements is realized by material union, for example by welding or soldering. Due to the material connection between the friction ring and the connecting elements only an unsatisfactory (unfavorable) fastening is achieved with regard to quality and position of the connection. While soldering connections become lose at temperatures above the melting temperature of the soldering medium and as a result represent an undefined connection, welding connections tend to have reduced strength in the edge regions due to changes in microstructure.

A material connection which partially or entirely loosens under the influence of high temperature can lead to a reversible and/or irreversible deformation (axial run-out, waviness, unbalance) of the brake disc. This promotes undesired uneven wear on the friction ring and thus leads to so-called "brake judder" which adversely affects driving comfort. As the case may be, a lasting deformation of the brake disc can lead to non-functioning of the entire braking system.

Because in addition, material connections are characterized by a high heat conductivity, they facilitate a high heat transfer from the friction ring to the connecting elements. This in turn results in the fact that an increased heat introduction into the carrier part also occurs via the contact sites of the connecting elements to the carrier part.

The temperature differences between the contact sites and the remaining carrier part resulting from this circumstance can also lead to deformation of the carrier part because the outer region of the carrier part expands more than the inner part. Therefore, undesired heat deformation can result, which deforms the carrier part in the manner of a "waviness" and leads to an axial run-out which is transferred to the friction ring.

It would therefore be desirable and advantageous to provide an improved brake disc that has a long service life and also ensures a high driving comfort and a high safety.

SUMMARY OF THE INVENTION

According to one aspect of the present invention, a brake disc for a disc brake of a motor vehicle, comprising a pot-shaped carrier part; a friction ring, and multiple connecting elements distributed in circumferential direction of the disc brake and extending in radial direction, and configured as separate components, wherein the carrier part and the friction ring re fixedly interconnected in radial direction via the multiple connecting elements, and wherein the connecting elements are form fittingly connected with the carrier part and with the friction ring.

The brake disc according to the invention is particularly advantageous because due to the form fitting connection a connection which is defined with regard to quality and position is now ensured, and which is in particular characterized by a low heat transmission. This means that due to the form fitting connection advantageously a satisfactory fastening at high temperatures is now ensured in which additionally the concern of strength decrease and/or an increased heat transmission is eliminated. This results in the fact that during braking a reversible and/or irreversible deformation (axial run-out, waviness, unbalance) does not occur. Thus a "judder" of the friction ring is prevented which has a positive effect on the driving comfort and the disc wear.

Preferably the brake disc is an internally ventilated brake disc, i.e., the friction ring has multiple cooling channels which internally cool the brake disc.

Particularly preferred is an embodiment in which the connecting elements have recesses or protrusions at their end region which faces the carrier part and the friction ring, and the connecting elements are form fittingly connected with the carrier part and the friction ring.

The formation of recesses and/or protrusions, for example in the form of a circumferential groove, is advantageous because during the casting process material for formfitting connection without radial clearance can enter the recess.

According to a particularly advantageous embodiment of the invention, the connecting elements are configured as hollow bodies. The configuration of the connecting elements as tubular hollow bodies is particularly advantageous because this enables a supply with cooling air into the cooling channels of the brake disc.

According to another embodiment of the invention the connecting elements are configured solid. The solid configuration of the connecting elements is advantageous with regard to manufacturing because a sealing of the connecting elements is not required and thus a simple and cost effective manufacturing is possible.

Preferably the connecting elements are configured rod shaped, having a round or angled cross section.

The invention is also based on the object to set forth a method for producing a brake disc of a motor vehicle, which enables a cost effective manufacturing of the brake disc.

The method for producing a brake disc for a disc brake includes the following method steps:
  producing a casting mold which includes the carrier part and the friction ring;
  producing a core mold;
  inserting the connecting elements (20) into the core mold;
  finishing the core by filling the core mold with filling material;
  inserting the core which has the connecting elements (20) into the casting mold;
  casting the brake disc;
  cooling the brake disc;
  material-removing post processing of the brake disc.

Because according to the method according to the invention the connection between the connecting elements and the friction ring, which connection is fixed in radial direction and is configured as form fit, is produced in the composite casting method, a cost effective manufacturing of the brake disc is ensured because further intermediate processing steps which are required in the state of the art, i.e., producing the material connection by means of welding, are no longer required.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 a sectional view of a brake disc according to the invention;

FIG. 2 a section viewed along the line A-A of the brake disc from FIG. 1;

FIG. 3 a sectional view along the line B-B of the brake disc from FIG. 2, and

FIG. 4 an enlarged representation of the connecting elements

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIGS. 1 and 2 show a brake disc for a motor vehicle overall designated with the reference numeral 10.

The brake disc 10 has a pod shaped carrier part 12 and a friction ring 14.

As can be seen in FIG. 1 the friction ring 14 is a ventilated friction ring including a friction ring half 14a and a friction ring half 14b which are interconnected via webs 16, so that cooling channels 18 are present between the friction ring halves 14a, 14b.

In the present case the carrier part 12 and the friction ring 14 are produced in the casting method. While the carrier part is made of an aluminum alloy, the friction ring 14 was produced from grey cast iron.

As can further be seen from FIGS. 1 and 2, the carrier part 12 and the friction ring 14 are interconnected via multiple connecting elements 20 which are distributed in circumferential direction u.

As can be seen in particular from FIG. 1, the friction ring 14 is connected form-fittingly with the carrier part 12, i.e., radially fixed with the carrier part 12, via the connecting element 20.

According to the embodiment shown in FIG. 1 the connecting element 20 is configured in the form of a hollow body and has at its end associated with the friction ring 14 and at its end which is associated with the carrier part 12 a respective circumferential groove 22.

The connecting element 20 is connected with the friction ring 14 and the carrier part 12 by means of composite casting. During casting, material flows into the circumferential groove 22 so that a form fitting connection is ensured between the connecting elements 20 and carrier part 12 or the connecting elements 20 and the friction ring 14.

As can again be seen clearly from FIG. 3, the connecting element 20 in the present case is a hollow body. This ensures the supply of cooling air into the cooling channels 18.

Another embodiment of the connecting elements 20 is shown in FIG. 4: the rod-shaped connecting elements 20 are hereby configured solid. While the connecting element shown on the right-hand side has a respective recess at its end regions in the form of a circumferential groove 22, a circumferential protrusion 24 is formed in the case of the connecting element shown on the left-hand side.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A brake disc for a disc brake of a motor vehicle, comprising:
  a pot-shaped carrier part;
  a friction ring, and
  multiple connecting elements distributed in circumferential direction of the disc brake and having a longitudinal extent extending in radial direction, and configured as separate components, said carrier part and said friction ring being fixedly interconnected in radial direction via the multiple connecting elements, wherein the connecting elements are form fittingly connected with the carrier part and with the friction ring so as to prevent movement of the pot-shaped carrier part and the friction ring relative to each other in the radial direction, wherein the connecting elements have end regions which respectively face the friction ring and the carrier part, wherein an annular recess or a circumferential protrusion is provided on either said end regions, and wherein the end regions are form fittingly connected with the carrier part and the friction ring by material of the carrier part and friction ring cast into the annular recess or about the circumferential protrusion.

2. The brake disc of the claim 1, wherein the friction ring has multiple cooling channels, said multiple cooling channels internally ventilating the brake disc.

3. The brake disc of claim 2, wherein the connecting elements are configured as a hollow body.

4. The brake disc of claim 2, wherein the connecting elements are configured solid.

5. The brake disc of claim 1, wherein the connecting elements are configured rod-shaped and have a round or angled cross section.

6. A method for producing the brake disc of claim 1, comprising:
- producing a casting mold which includes the carrier part and the friction ring;
- producing a mold for a core;
- inserting the connecting elements into the mold for the core;
- producing the core by filling the mold for the core with casting material, so that the casting material flows into the recesses or about the protrusion;
- inserting the core having the connecting elements into the casting mold;
- casting the brake disc so that the casting material flows into the recesses or about the protrusion;
- cooling the brake disc;
- material-removing post processing of the brake disc.

* * * * *